United States Patent [19]

Maeda et al.

[11] Patent Number: 5,343,452
[45] Date of Patent: Aug. 30, 1994

[54] DATA RECORDING/REPRODUCING APPARATUS OF SIMULTANEOUSLY PERFORMING BOTH REPRODUCING AND RECORDING FROM AND IN A SINGLE RECORDING MEDIUM

[75] Inventors: Shigemi Maeda, Yamatokooriyama; Kunio Kojima, Nara; Jun Akiyama, Kashihara, all of Japan

[73] Assignee: Sharp Kabushiki Kaisha, Osaka, Japan

[21] Appl. No.: 979,066

[22] Filed: Nov. 19, 1992

[30] Foreign Application Priority Data

Nov. 28, 1991 [JP] Japan ................................. 3-340417

[51] Int. Cl.$^5$ ................................................ G11B 7/00
[52] U.S. Cl. ........................................ 369/32; 369/33; 369/47
[58] Field of Search ........................ 369/32, 33, 13, 59, 369/47, 48, 54

[56] References Cited

U.S. PATENT DOCUMENTS

| 4,788,685 | 11/1988 | Sako et al. ............................ 369/13 |
| 4,907,216 | 3/1990 | Rijinsburger ...................... 369/275 |

FOREIGN PATENT DOCUMENTS

| 0429139 | 5/1991 | European Pat. Off. . |
| 0463183 | 1/1992 | European Pat. Off. . |
| 0464216 | 1/1992 | European Pat. Off. . |
| 0465053 | 1/1992 | European Pat. Off. . |
| 0512821 | 11/1992 | European Pat. Off. . |
| 9111002 | 7/1991 | PCT Int'l Appl. . |
| 9111003 | 7/1991 | PCT Int'l Appl. . |
| 2136192 | 9/1984 | United Kingdom . |

OTHER PUBLICATIONS

Nakajima & Ogawa: "Compact Disc Guide," vol. 2, Apr. 25, 1988, pp. 7–23, 114–139, 179–187, 258–259.
An excerpt entitled "Algorithms and Standardization Movement on Sound Coding" by Shinji Hayashi of NTT Human Interface Laboratories.

Primary Examiner—Robert J. Pascal
Assistant Examiner—Tan Dinh
Attorney, Agent, or Firm—Nixon & Vanderhye

[57] ABSTRACT

A data recording/reproducing apparatus uses a single recording medium in which absolute address data are previously formed. Also, the data recording/reproducing apparatus has a first memory for recording and a second memory for reproducing. Audio data reproduced from the recording medium is stored in the second memory at a first transfer rate, and the audio data stored in the second memory is sequentially read at a second transfer rate lower than the first transfer rate to be audio-reproduced, while audio data inputted from external is sequentially stored in the first memory at the second rate and the audio data stored in the first memory is read at the first transfer rate to be recorded on the recording medium. The aforementioned reproducing and recording operations are alternately repeated. Thus, the data recording/reproducing apparatus allows audio data recording operation to be concurrently performed during audio reproduction with the single recording medium.

3 Claims, 11 Drawing Sheets

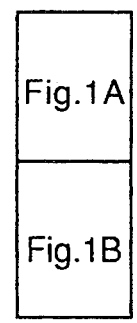
Fig.1
Fig.1A
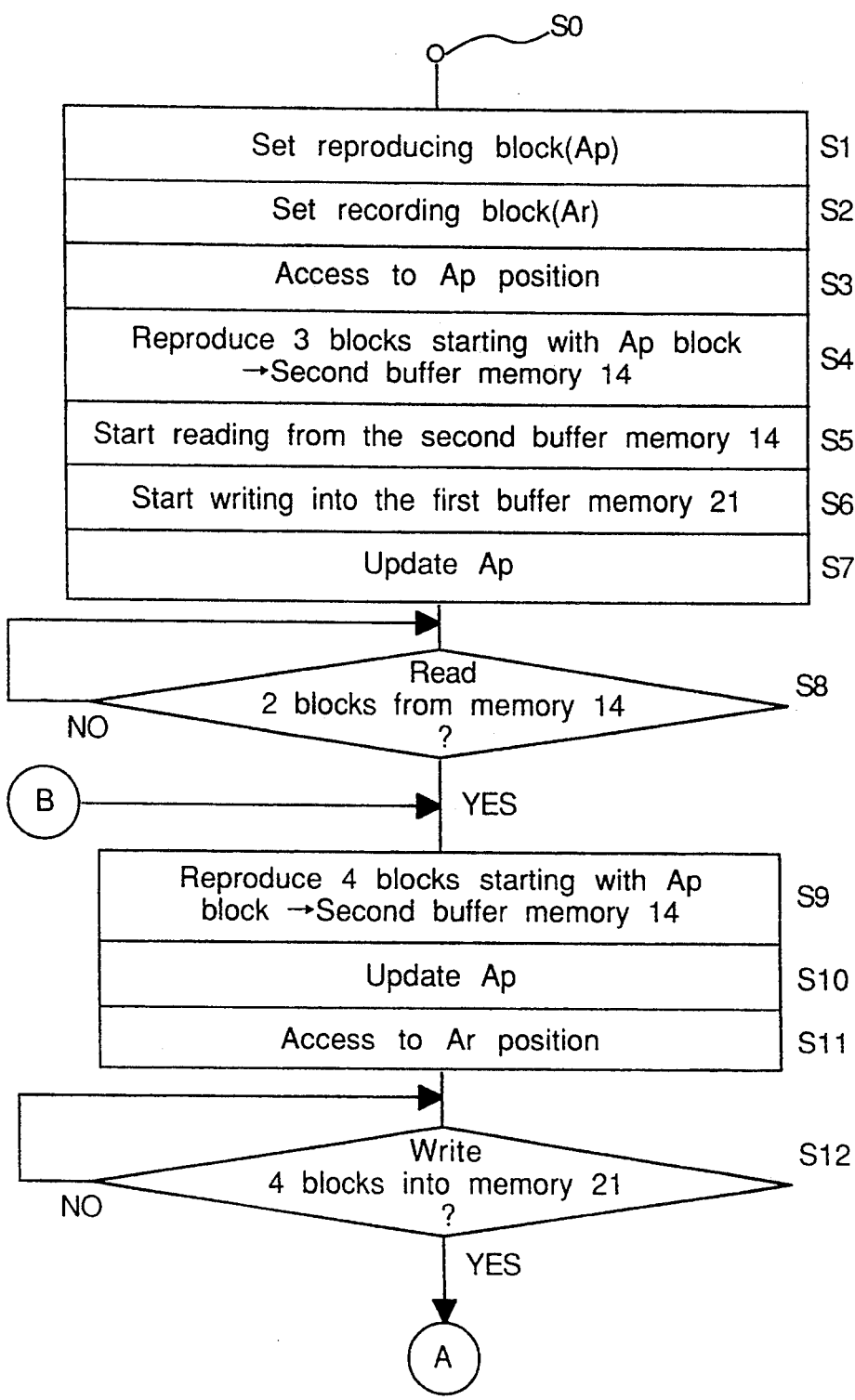

DATA RECORDING/REPRODUCING APPARATUS OF SIMULTANEOUSLY PERFORMING BOTH REPRODUCING AND RECORDING FROM AND IN A SINGLE RECORDING MEDIUM

BACKGROUND OF THE INVENTION

1. Field of the Invention

The present invention relates to a data recording/reproducing apparatus utilizing a recording medium which allows digitized audio signals or the like to be arbitrarily recorded, for example, on recordable compact discs.

2. Description of the Prior Art

Heretofore, there have been widely used so-called compact discs, in which continuous data such as musical data are recorded as digital signals by means of optically detectable minute bits. The compact discs are adapted for playback by an optical disc player exclusively provided for playing them back.

FIGS. 13 and 14 are schematic views for explaining a signal format used in compact discs. As shown in FIG. 13, one frame 101a of recording signals is composed of a frame synchronizing signal 101b showing the head of the frame 101a, a subcode 101c showing additional data pertaining to primary data, and a data field 101d containing 24-byte data, which is the primary data, and a parity code for error detection/correction added to the primary data. It is noted that the data field 101d is provided by an error detection/correction system in which CIRC (Cross Interleaved Reed Solomon Code) incomplete interleave is combined.

As shown in FIG. 14, a sector 102a is made up of the 98 frames 101a, and a subcoding frame 102c is made up of the 98 subcodes 101c, showing track number (for musical primary data, called music number), absolute address data on the disc, and the like.

The time length of the sector 102a is 1/75 sec. and therefore 75 sectors correspond to 1 sec. A sector number is given by min.—sec.—frame data (where the frame is in base-75 system), forming time data and position data increasing from the innermost circumference of the disc and on stepwise.

Further, a data field 102d within the sector 102 is composed of 2352-byte primary data and 784-byte parity by a 98-frame architecture; with audio data allocated to primary data, according to a compact-disc format, a sampling frequency thereof is 44.1 kHz, a quantization is by 16 bits, and the number of channels is 2 (stereo), and therefore the amount of data per second is (44.1 kHz × 16 × 2) = 1.4112 Mbits = 176.4 k bytes, and the amount of data per sector is (176.4 k bytes/75) = 2352 bytes, which are allotted to the aforementioned primary data.

FIG. 12 is a schematic view showing an area location on a compact disc. A compact disc 100 is made up of a primary data recording area 100b, which contains primary data, such as musical data, and sector numbers by means of the subcode, and a TOC (Table Of Contents) area 100a where additional data pertaining to individual primary data recorded on the primary data recording area 100b are represented by the subcode, the additional data including, for example, track numbers, recording-start sector numbers for individual tracks, and information for discriminating whether the track is allocated to audio data, such as music, or computer-oriented data. With the above-described format, a compact disc player reads the subcode data of the TOC area 100a at the time of the disc being loaded to recognize the amount of individual primary data (for musical data, corresponding to the number of musical pieces), the sector number of its corresponding recording-start position, and the type of data (audio data or other data), thereby allowing desired tracks to be reproduced in response to a subsequent reproduction instruction promptly by access operation by making cross-reference between the data of the TOC area 100a and the sector number by the subcode of the primary data recording area 100b.

These compact discs are recorded with a constant linear velocity, or in the so-called CLV (Constant Linear Velocity) system in the recording mode, and therefore the resulting recording density is constant at any position on the compact disc, thus achieving enhanced recording capacities. In actual compact disc players, the rotation of a compact disc is controlled so that the time intervals of reproducing signals from the compact disc that has been CLV-recorded on the aforementioned signal format, for example, those of the frame synchronizing signals coincide with a reference time length, thereby accomplishing a CLV control.

From a different viewpoint, when such rewritable discs as magneto-optical discs under the recent years' aggressive development are employed with various types of data such as musical data or computer data recorded thereon, it desirable to offer such disc recording/reproducing apparatus as are common in the reproducing system to the conventional compact discs and have compatibility therewith.

In such a case, especially in an initial compact disc that has not undergone data recording, there exist no absolute address data using the subcode by the aforementioned signal format for the compact disc, or frame synchronizing signal as employed for the CLV control, or any other things. Therefore, it is impossible to perform the access operation to any arbitrary sector prior to recording, or do the CLV control needed even during recording.

Thus, there has been proposed a system of recording absolute addresses equivalent to the absolute address data by the aforementioned subcode, in which an absolute address is biphase-mark modulated and thereafter the guide recess of an optical disc is shifted radially inward or outward of the optical disc or the width of the guide recess is changed, depending on whether each bit is "1" or "0" (see Japanese Patent Laid-Open Publication No. 64-39632).

With the above arrangement, if the frequency band for the absolute address in biphase-mark modulation and that for the recording data in EFM (Eight to Fourteen Modulation) is differentiated from each other, it is possible to separate them from each other and reproduce as such and moreover to make access operation using the absolute address with the aid of the guide recess even for areas having no recording data. Besides, by using reproducing carrier components of the absolute address, an accurate CLV control can be provided, which may be effected even during recording.

However, the above-described disc recording/reproducing apparatus using rewritable discs is only capable of recording during the recording operation, as is also the case with tape recorders using compact cassettes or the like that are conventional data recording/reproducing apparatus of most common consumer use. Moreover, since the disc recording/reproducing apparatus is a single-purpose processing apparatus which works exclusively for reproduction during a reproducing operation, it can perform neither concurrent reproduction for any other purpose during a recording operation nor concurrent recording for any other purpose during a reproducing operation.

For example, when the contents of playing performance using a plurality of musical instruments are recorded and edited for each instrument, it is conceivable that one instrument is first played and recorded, and while the recorded contents are being reproduced to verify them by ear, another instrument is played to record over the former. In such a case, however, there would arise the need of a plurality of recording/reproducing apparatus and a plurality of recording media, involving increased location space and costs, as well as the need of operating simultaneously the plurality of recording/reproducing apparatus with the result of degraded operability.

Indeed, there have been available business-use recording/reproducing apparatus such as multi-track recorders, which have a number of recording channels and can perform recording and reproduction independently of each other for each channel, but they are very expensive and complex in operation due to its multifunction, thus not lending themselves to friendly consumer use.

Further, in so-called 'karaoke' systems, which are recorded instrumental music systems to accompany live singing, increasing popular for household consumer use, it may often be desired to record the contents of having sung to the reproduced instrumental accompaniment in the way of mixing. In such a case, also, there would arise the need of a recording medium and reproducing apparatus for reproducing the contents of the instrumental accompaniment, as in the above case, as well as the need of another recording medium and recording apparatus for recording audio data of having done the mixing, while both of the apparatus would be necessarily operated simultaneously, which would be very laborious work to a disadvantage.

Moreover, it is undesirable that those playing-side recording medium and recording-side recording medium exist separately, because complex work will be involved in the storage and control of these recording media.

SUMMARY OF THE INVENTION

The object of the present invention is therefore to provide a data recording/reproducing apparatus which solves these problems.

In order to achieve the aforementioned object, there is provided a data recording/reproducing apparatus for recording and/or reproducing audio data onto or from a recording medium having absolute address data, the apparatus comprising: a first memory for recording; a second memory for reproducing; a first reproducing means for reading audio data on the recording media by the block and storing them in the second memory at a first transfer rate; a second reproducing means for sequentially reading the audio data stored in the second memory at a second transfer rate lower than the first transfer rate and sequentially outputting them; a first recording means for sequentially storing audio data, which is inputted from external, in the first memory at the second transfer rate; a second recording means for reading the audio data stored in the first memory at the first transfer rate and recording them in the recording medium by the block; and control means for controlling so that writing operation into the second memory by the first reproducing means and reading operation from the first memory by the second recording means are alternately repeated.

In the data recording/reproducing apparatus according to the present invention, audio data reproduced from the recording medium is stored in the second memory at the first transfer rate, and the audio data stored in the second memory is sequentially read at the second transfer rate lower than the first transfer rate to be audio-reproduced, while audio data inputted from external is sequentially stored in the first memory at the second rate and the audio data stored in the first memory is read at the first transfer rate to be recorded on the recording medium, and further the aforementioned reproducing and recording operations are alternately repeated. Thus, the data recording/reproducing apparatus allows audio data recording operation to be concurrently performed during audio reproduction.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention is described below based on an embodiment of a data recording/reproducing apparatus employing a rewritable disc, with reference to FIGS. 1 through 11.

Figure 2:
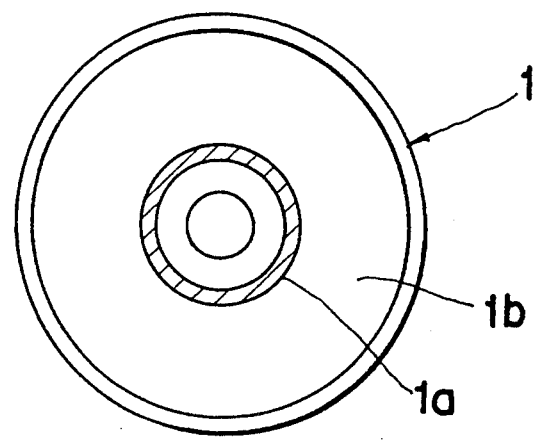
FIG. 2 is a schematic plan view of a magneto-optical disc applied to the present invention.

Referring to FIG. 2, a magneto-optical disc 1 as a rewritable optical disc includes a TOC area 1a for storing control data at an end of the inner circumferential side and a primary data area 1b occupying almost all the area outside the TOC area 1a.

The primary data area 1b records therein music data, while the TOC area 1a records therein additional data pertaining to various data stored in the primary data area 1b, the additional data including, for example, music numbers, start absolute addresses, and end absolute addresses for each piece of the recorded data. The same signal format as shown in FIGS. 13 and 14 for the description of the prior art example can be used in the present case.

Figure 3:
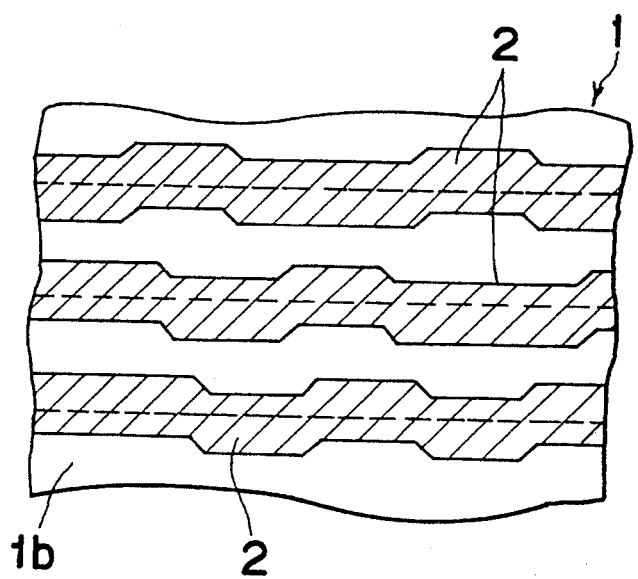
FIG. 3 is an enlarged plan view of the magneto-optical disc.

Referring to FIG. 3, in the TOC area 1a and the primary data area 1b of the magneto-optical disc 1, spiral guide grooves 2, 2, . . . (shown in the hatched areas for convenience) are beforehand formed at specified intervals in the radial direction of the magneto-optical disc 1. The absolute addresses on the magneto-optical disc 1 are, after subjected to biphase-mark modulation, defined by deviating the grooves 2, 2, . . . radially inward or outward of the magneto-optical disc 1, depending on whether the bit is "1" or "0".

It is noted that the absolute address represents a position on the magneto-optical disc 1 and provides prerecorded data as CLV rotation control data. Since an absolute address corresponds to one sector in the aforementioned compact-disc format, the absolute address is referred to also as sector hereinafter.

Figure 4:
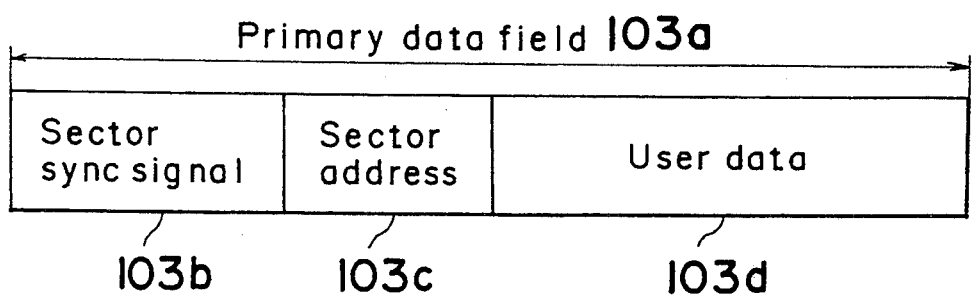
FIG. 4 is a schematic view showing a primary data format within a sector.
Figure 5:
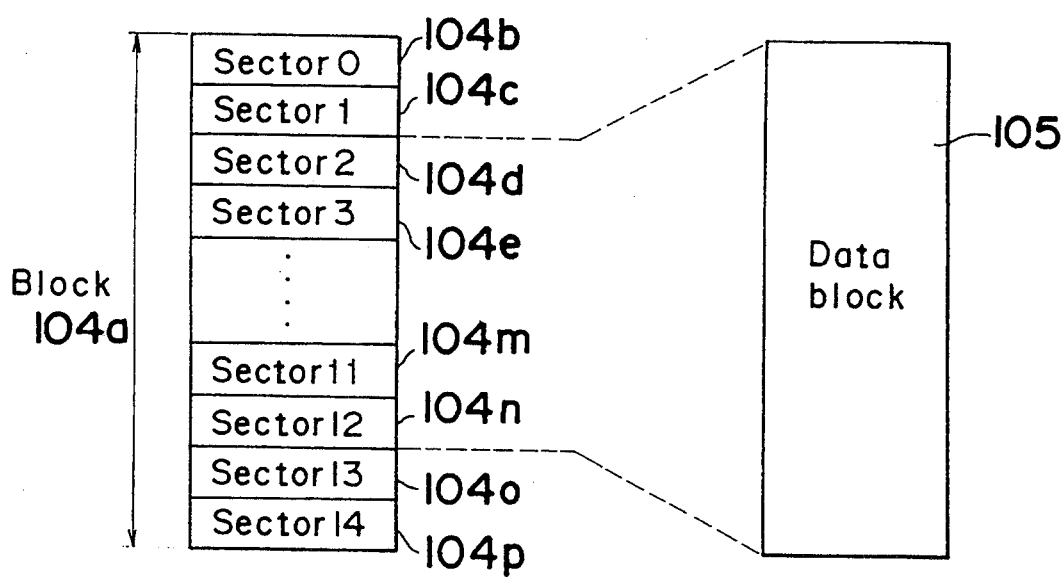
FIG. 5 is a schematic view showing a sector construction within a block.
Figure 6:
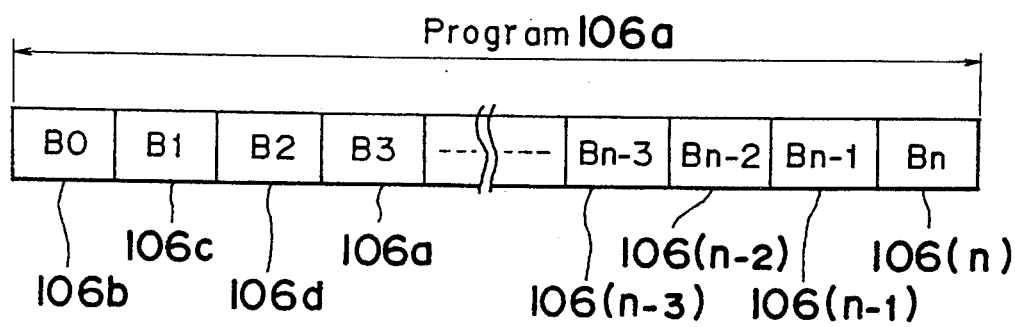
FIG. 6 is a schematic view showing a block construction within a program.
Figure 13:
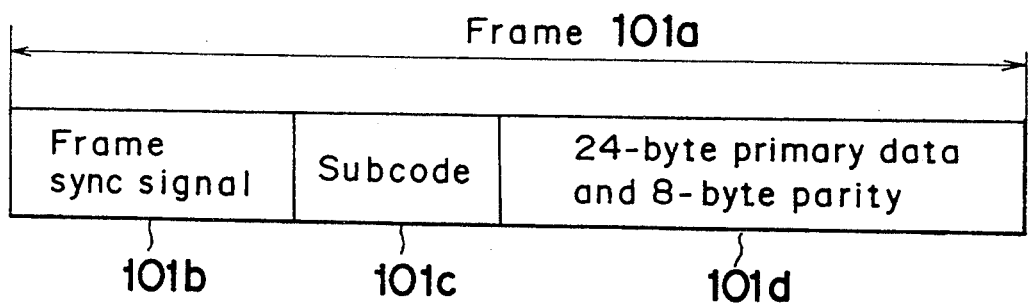
FIG. 13 is a schematic view showing a frame signal format of a compact disc.
Figure 14:
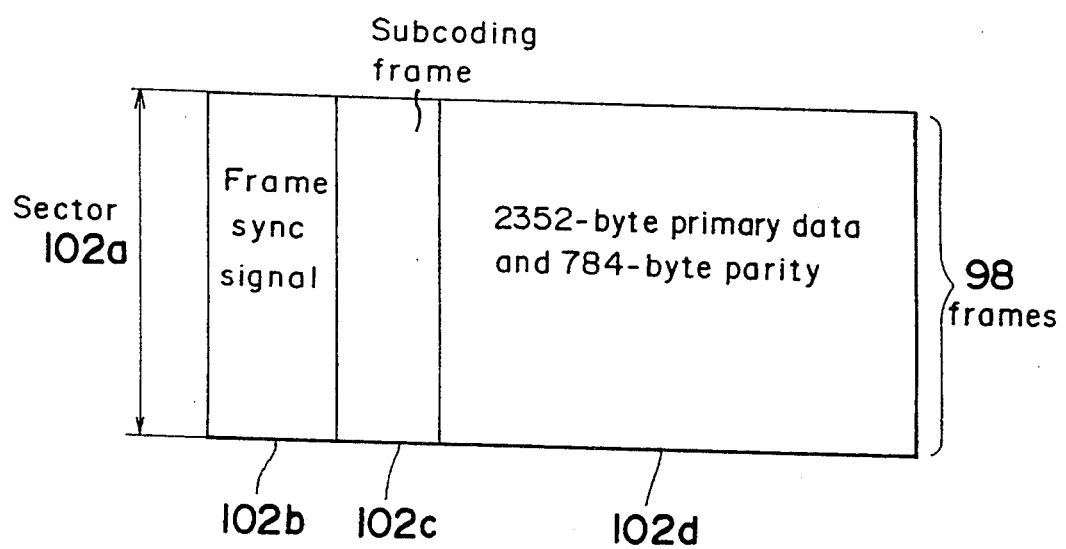
FIG. 14 is a schematic view showing a sector format of a compact disc.

FIGS. 4 through 6 show a data allocation example in the present invention based on the format as shown in FIGS. 13 and 14.

FIG. 4 shows the format of the 2353-byte primary data portion of the sector construction shown in FIG. 14, where a primary data field 103a is composed of a sector synchronizing signal 103b for discriminating the head of a sector, a sector address 103c for representing the address of each sector, and user data 103d.

It is noted that the sector address is, for example, of the same value as the absolute address data prerecorded on the magneto-optical disc 1. In regard to byte construction, taking the one in CD-ROMs (Compact Disc-Read Only Memory) as an example, 12 bytes can be allotted to the sector synchronizing signal 103b and 4 bytes (referred to as header in CD-ROMs) can be allotted to the sector address 103c. Therefore, there can be used as user data per sector, $$(2352-12-4)=2336 \text{ bytes.}$$

FIG. 5 shows the format of a block used for enabling the rewriting of data in the present embodiment, where a block 104a being the minimum unit for recording/reproducing operation is composed of 15 sectors of sector 0 (104b) through sector 14 (104p) in total.

Of these sectors, a group of sector 0 (104b) and sector 1 (104c) and another group of sector 13 (104o) and sector 14 (104p) are sector groups to be added for rewriting in the units of blocks. The reason of this arrangement is that, when an attempt is made to rewrite data on the above-mentioned compact-disc signal format, the data at a target sector position is distributed to the fore and hind sectors on the actual compact disc due to the CIRC incomplete interleave, making it difficult to rewrite only the target data (see Japanese Patent Publication No. 64-55787 for more detail).

Although recording data is fully continuous according to the CD format, a large number of data errors take place at the start and end points of recording when rewriting is performed. For an attempt to effect the inherent CIRC correction capability, since the incomplete interleave code propagation length requires 105 frames, it is preferred to provide additional 1.07 sectors, or practically 2 sectors before and behind a sector composed of 98 frames. Furthermore, the forward additional sector is also necessary as an area for leading in PLL (Phase Locked Loop) from the recording start point.

Therefore, the block 104a has each two additional sectors allotted before and behind the sectors in which user data are stored, within the 15 sectors. Meanwhile a data block 105 is allocated to 11 sectors of sector 2 (104d) through sector 12 (104n) and the data block 105 is given an amount of data:

$$(2336 \times 11 \approx 25.7 \text{ k bytes} \approx 206 \text{ k bits})$$

Furthermore, FIG. 6 shows an arrangement of the above-mentioned blocks practically used for music data, where a program 106a corresponding to one music is composed of a set of blocks in series such as blocks B0 (106b) through Bn (106(n)).

Figure 9:
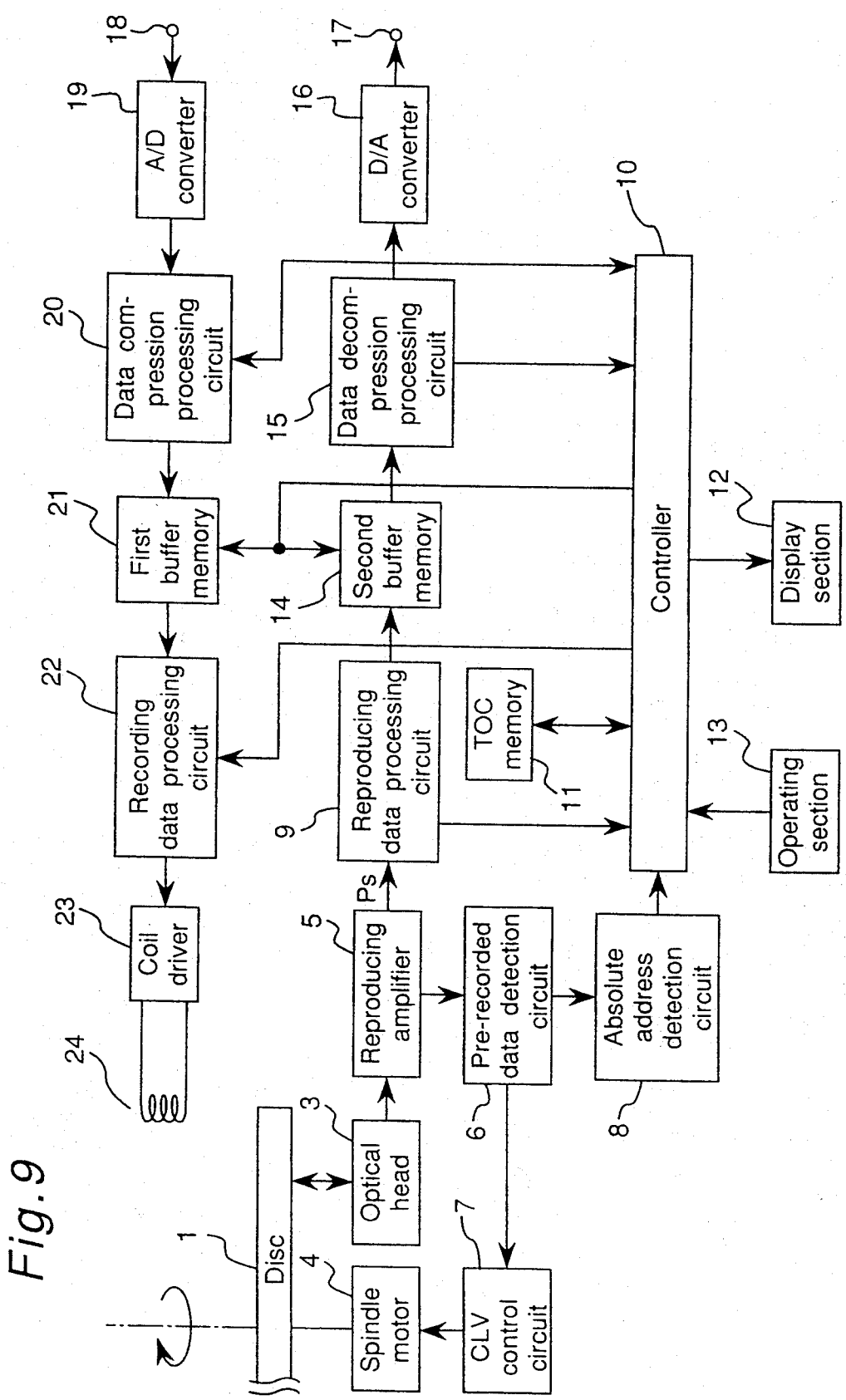
FIG. 9 is a block diagram of an embodiment of the data recording/reproducing apparatus according to the invention.

FIG. 9 is a block diagram showing an embodiment of the data recording/reproducing apparatus according to the present invention. The data recording/reproducing apparatus of the present embodiment comprises a spindle motor 4 for supporting and rotating the magneto-optical disc 1, an optical head 3 for throwing a laser beam onto the magneto-optical disc 1 for recording and reproduction, and a coil 24 for applying a magnetic field onto the magneto-optical disc 1 for recording. The present data recording/reproducing apparatus is so constructed as to perform recording in the so-called magnetic field modulation system and to allow new data to be overwritten on previously recorded data.

Referring first to basic data recording operation, an analog signal inputted through an input terminal 18 is converted into a digital signal by an A/D (analog-to-digital) converter 19 and then supplied to a data compression processing circuit 20.

The data compression processing circuit 20 is the section for compressing digital audio data successively inputted from the A/D converter 19 according to a specified algorithm, where audio data having a sampling frequency of 44.1 kHz and a quantization bit number of 16 bits is compressed into that of 128 kbps per channel (practically 256 kbps for 2 channels in this case).

In more detail, since data of $44.1 \text{ kHz} \times 16 \times 2 \approx 1.41$ Mbps is compressed into that of 256 kbps, a compression ratio of $256 \text{ k}/1.41 \text{ M} \approx 1/5.5$ can be obtained. For practical use, a variety of methods such as Audio spectral perceptual entropy coding, Adaptive transform audio coding, etc. introduced in "Sound Coding Algorithm and Standardization", by Shinji Hayashi, (The transactions of the institute of electronics and communication engineers of Japan Vol. 89, No. 434, pp. 17–22) can be employed. However, since the present embodiment is not limited to the contents of the methods, their descriptions are omitted.

The data compression processing circuit 20, besides the aforementioned compression processing, adds the sector synchronizing signal 103b and sector address 103c given from a controller 10 for each sector according to the primary data format within each sector as shown in FIG. 4. Thereafter, it generates additional sectors 104b, 104c, 104o, 104p as shown in FIG. 5 and once writes them into a first buffer memory 21 along with the compressed audio data as a compressed audio data block. Then the compressed audio data block is read at a required timing under the instruction of the controller 10, being transmitted to a recording data processing circuit 22.

In the recording data processing circuit 22, CIRC error detection/correction parity is generated and added to the compressed audio data block derived from the first buffer memory 21. Further, subcode data derived from the controller 10 is added, and after EFM modulation is effected, a frame synchronizing signal is further added to the audio data block, being supplied to a coil driver 23. The coil driver 23 drives the coil 24 based on the signal supplied thereto and at the same time, a laser beam is applied from the optical head 3 onto the magneto-optical disc 1, thereby accomplishing the recording of the signal.

In a basic reproducing operation, the signal reproduced in the optical head 3 is amplified in an reproducing amplifier 5 to supply a binary-converted magneto-optical signal Ps to a reproducing data processing circuit 9, while pre-recorded data is transmitted to a prerecorded data detection circuit 6. The pre-recorded data detection circuit 6 is composed of, for example, a band-pass filter and a PLL to generate a PLL-synchronized clock to the pre-recorded data in the reproducing signal extracted from the band-pass filter. Then a clock synchronized with the pre-recorded data composed of biphase-mark modulated absolute address data is supplied to a CLV control circuit 7.

The CLV control circuit 7 performs an accurate CLV control by comparing the synchronizing clock from the pre-recorded data detection circuit 6 with a reference frequency internally stored and controlling the spindle motor 4 with the resulting difference signal. The pre-recorded data in the reproducing signal extracted by the pre-recorded data detection circuit 6 is supplied to an absolute address detection circuit 8.

The absolute address detection circuit 8, composed of a biphase-mark demodulator and an address decoder, performs a biphase-mark demodulation of the pre-recorded data extracted by the pre-recorded data detection circuit 6. Thereafter, the demodulated pre-recorded data is decoded by the address decoder into absolute address values which are position data on the disc 1, i.e. sector numbers, being supplied to the controller 10.

In the reproducing data processing circuit 9, the frame synchronizing signal is separated from the binary-converted magneto-optical signal Ps in the reproducing signal supplied from the reproducing amplifier 5 and EFM-demodulation is performed to separate subcode data, transmitting it to the controller 10, while a CIRC error correction operation is performed using reproduced data parity.

The reproducing data error-corrected by the reproducing data processing circuit 9 is once written into a second buffer memory 14 as a compressed audio data block under the instruction of the controller 10 and then read under the instruction of the controller 10 to be supplied to a data decompression processing circuit 15.

In the data decompression processing circuit 15, sector address data is extracted from the compressed audio data block read from the second buffer memory 14 and supplied to the controller 10. Meanwhile, the compressed audio data is treated for a specified decompression processing (corresponding to the compression processing) and sequentially supplied to the D/A converter 16, thereby reproducing as outputs audio data restored in an analog form from a terminal 17.

The controller 10 receives recording and reproducing instructions of the user via an operating section 13 and sequentially displays music number, time data, and the like pertaining to recording and reproduction on a display section 12. The controller 10 has an access function of receiving absolute address data (i.e. sector value) from the absolute address detection circuit 8 to recognize the position of the optical head 3 on the disc 1 and also of moving the optical head 3 to a desired position by means of an optical head moving mechanism (not shown).

The controller 10 also performs recognition of subcode data given from the reproducing data processing circuit 9. When a recognized subcode has the contents of the TOC area, the subcode is stored as control data in a TOC memory 11 and the control data is read from the TOC memory 11 as required. In recording, a sector address corresponding to the absolute address data is supplied to the data compression processing circuit 20. Meanwhile, absolute address data corresponding to the recorded primary data (musical data) is stored in the TOC memory 11. By supplying the contents of the TOC memory 11 to the recording data processing circuit 22 as subcode data as required, control data is registered into the TOC area 1a of the magneto-optical disc 1.

The controller 10 also serves as a control means for writing and reading compressed audio data blocks into and from the first buffer memory 21 and the second buffer memory 14 in connection with the above-mentioned operations.

Figure 7:
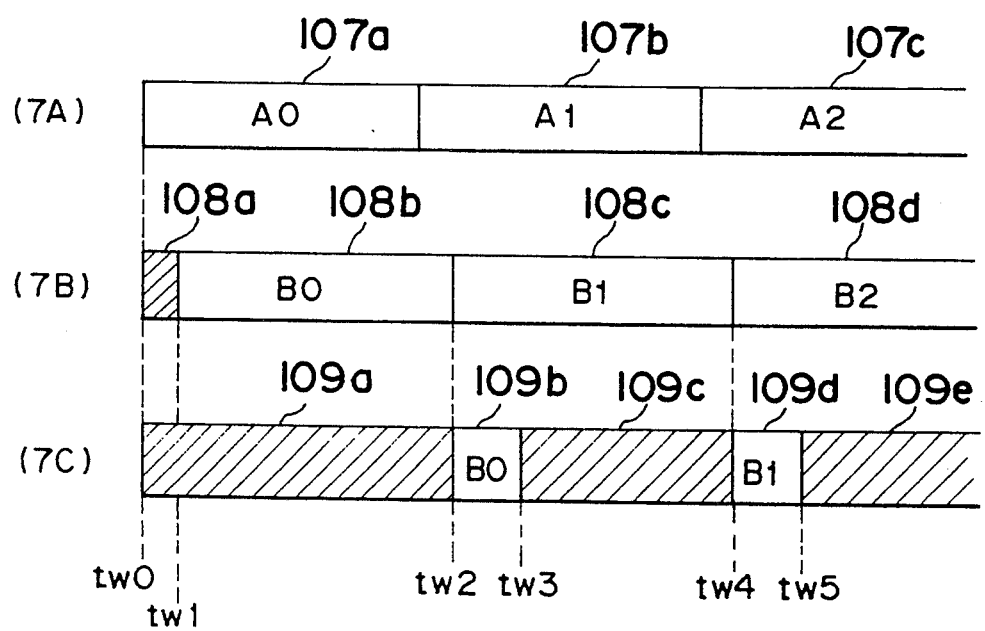
FIG. 7 is a timing chart showing data pertaining to recording operation.
Figure 8:
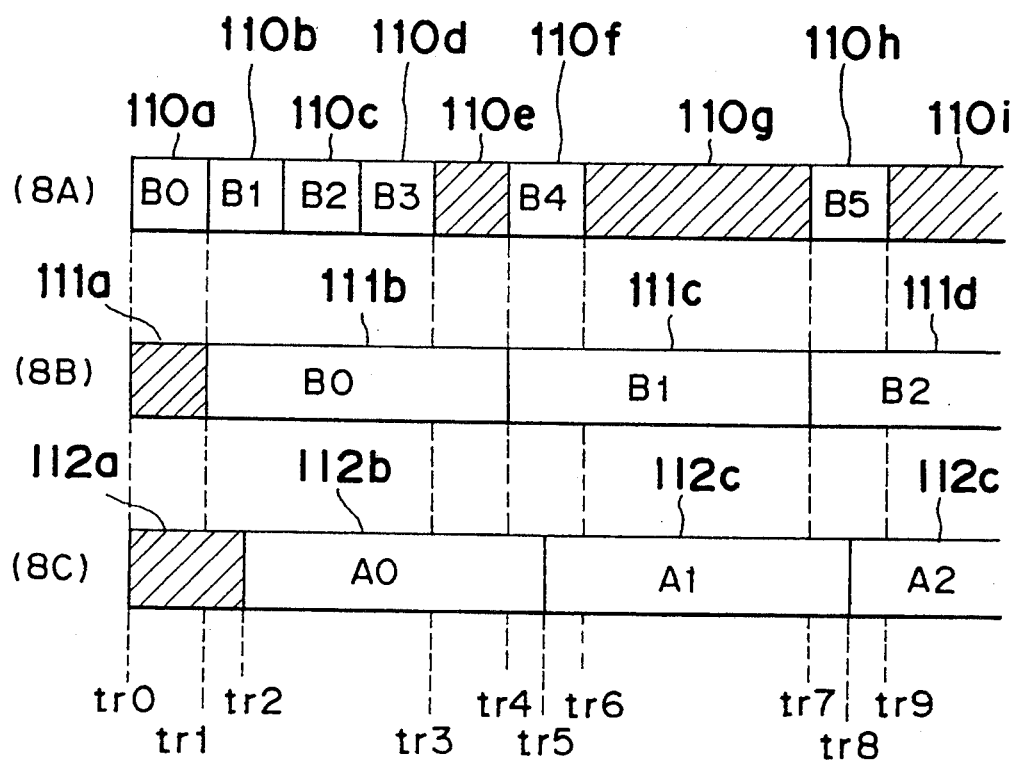
FIG. 8 is a timing chart showing data pertaining to reproducing operation.

FIGS. 7 and 8 are schematic timing charts for explaining the basic recording and reproducing operations (in the case where each operation is performed singly) of the present data recording/reproducing apparatus. These operations are described below with reference to the figures plus FIG. 9.

FIG. 7 shows an operation in the recording mode (recording only without reproduction), where (7A) depicts input data (a series of digital audio data before compression) of the data compression processing circuit 20, (7B) depicts compressed audio data blocks (a series of digital audio data after compression) which is outputted from the data compression processing circuit 20 and written into the first buffer memory 21, and (7C) depicts compressed audio data blocks (compressed audio data blocks to be recorded) which is read from the first buffer memory 21 and outputted to the recording data processing circuit 22, the figure showing relationships among them.

It is noted that the hatched portions in FIG. 7 represent periods during which no data transfer takes place. Analog audio data inputted through the terminal 18 is continuous data, and converted into digital audio data of 1.41 Mbps by the A/D converter 19. If the continuous data in this case is taken in correspondence to the blocks described later, as shown in FIG. 7 (7A), each of the blocks A0(107a), A1(107b), A2(107c), . . . forms audio data equivalent to approx. 0.8 sec., and its amount of data is (44.1 kHz × 16 bits × 2 channels × 0.8 sec. = 1.12896 M bits) = 141.12 k bytes.

This series of pre-compression data is compressed into approx. 1/5.5 by the data compression processing circuit 20, resulting in an amount of compressed audio data of (141.12 k bytes/5.5)≈25.66 k bytes.

Further, the compressed audio data is combined with a sector synchronizing signal and sector address data as shown in FIG. 4 and additional sectors as shown in FIG. 5, and the combined data are sequentially written into the first buffer memory 21 as compressed audio blocks B0(108b), B1(108c), B2(108d), . . . from time point tw1 with a slight delay of processing time later than tw0, as shown in FIG. 7 (7B).

It is noted that, in the compressed audio data blocks as shown in FIG. 7 (7B), a sector synchronizing signal (12 bytes×15 sectors) and sector address data (4 bytes×15 sectors), and additional sectors (2336 bytes×4 sectors) are added to the aforementioned compressed audio data per block (25.66 k bytes), the resulting total capacity of the block is 25.66 k+(12×15)+(4×15)+(2336×4) ≈35.2 k bytes, and the writing transfer rate into the first buffer memory 21 is ((35.2 k bytes×8 bits)/0.8 sec)≈352.4 kbps.

On the other hand, referring to the compressed audio data block having been written into the first buffer memory 21, each time it has been completely written therein as shown in FIG. 7 (7C) (at tw2, tw4, . . . ), compressed audio data blocks B0(109b), B1(109d), . . . , are read from the first buffer memory 21 and outputted to the recording data processing circuit 22, thus accomplishing recording along with the aforementioned sequence of operations.

It is noted that the memory reading rate in FIG. 7 (7C) (equivalent to the transfer rate of recording data) is 1.41 Mbps, equal to that in conventional compact discs, and equivalent to a multiplying factor of the aforementioned memory writing transfer rate of (1.41 Mbps/352.4 kbps)≈4 times.

From the facts that each of the compressed audio data blocks B0(109b), B1(109d), . . . on the magneto-optical disc 1 is composed of 15 sectors and that the time per sector is 1/75 sec., the above correlation results in (1/75)×15=0.2 sec, which is (0.8/0.2)=4 times, as compared with 0.8 sec. that is the time occupied by the pre-compression audio blocks A0(107a), A1(107b), A2(107c), . . . , equal to the aforementioned transfer rate ratio.

Accordingly, the actual recording operation is performed in a time of ¼ with respect to the compressed audio data block time for one block, while the remaining ¾ of the time is dedicated to standby. Thereafter, these intermittent recording operations are repeated to accomplish the recording of the continuous audio data inputted from external.

FIG. 8 shows the operation during the reproduction (in this case, only reproduction without recording), where (8A) depicts a compressed audio data block which is reproduced from the magneto-optical disc 1 and written into the second buffer memory 14 from the reproducing data processing circuit 9; (8B) depicts a compressed audio data block which is read out of the second buffer memory 14 and fed to the data decompression processing circuit 15; and (8C) depicts the post-decompression audio data rows outputted from the data decompression processing circuit 15, the figure showing decompression relationships among them. In addition, the hatched portion in FIG. 8 represents an interval during which no data transfer takes place.

First, during a period from tr0 to tr3, as shown in FIG. 8 (8A), compressed audio blocks B0(110a), . . . , B3(110d) are written into the second buffer memory 14 at a time, and thereafter writing is interrupted. The reason of the interruption is that the capacity of the second buffer memory 14 is limited, and as far as FIG. 8 is concerned, a case is presented where the buffer memory capacity is equivalent to 4 blocks, for simplicity of description.

It is noted that the buffer memory writing transfer rate in FIG. 8 (8A) is 1.41 Mbps, correspondingly to that in the recording operation.

Simultaneously with this, in FIG. 8 (8B), as the compressed audio data block B0(110a) has completely been written into the second buffer memory 14 at time point tr1, a read operation is started. The memory reading transfer rate of the compressed audio data block B0(111b) in this case is corresponding to that in the recording operation, being 352.4 kbps.

Further, the audio reproduction after audio data decompression is effected by the data decompression processing circuit 15's starting the audio output after decompression from time point tr2, with a slight delay of processing time later than tr1.

On the other hand, when time point tr4 is reached, the compressed audio data block B0(111b) in FIG. 8 (8B) has completely been read, leaving an empty space in the second buffer memory 14. Thus, as shown in FIG. 8 (8A), the compressed audio data block B4(110f) is reproduced, that is, written into the second buffer memory 14, a standby state following thereafter again.

It is noted that the ratio between the writing transfer rate and the reading transfer rate into and from the second buffer memory 14 is (1.41 Mbps/352.4 kbps)≈4 times, and therefore the actual reproducing operation is performed in a time of ¼ of the compressed audio data block time for one block, while the remaining ¾ time is dedicated to standby. Thereafter, similarly, each time an empty space arises in the second buffer memory 14, a compressed audio data block is intermittently read out of the magneto-optical disc 1 to write (feed) it into the second buffer memory 14, thereby accomplishing the reproduction of continuous audio data without interruption.

Figure 1B:
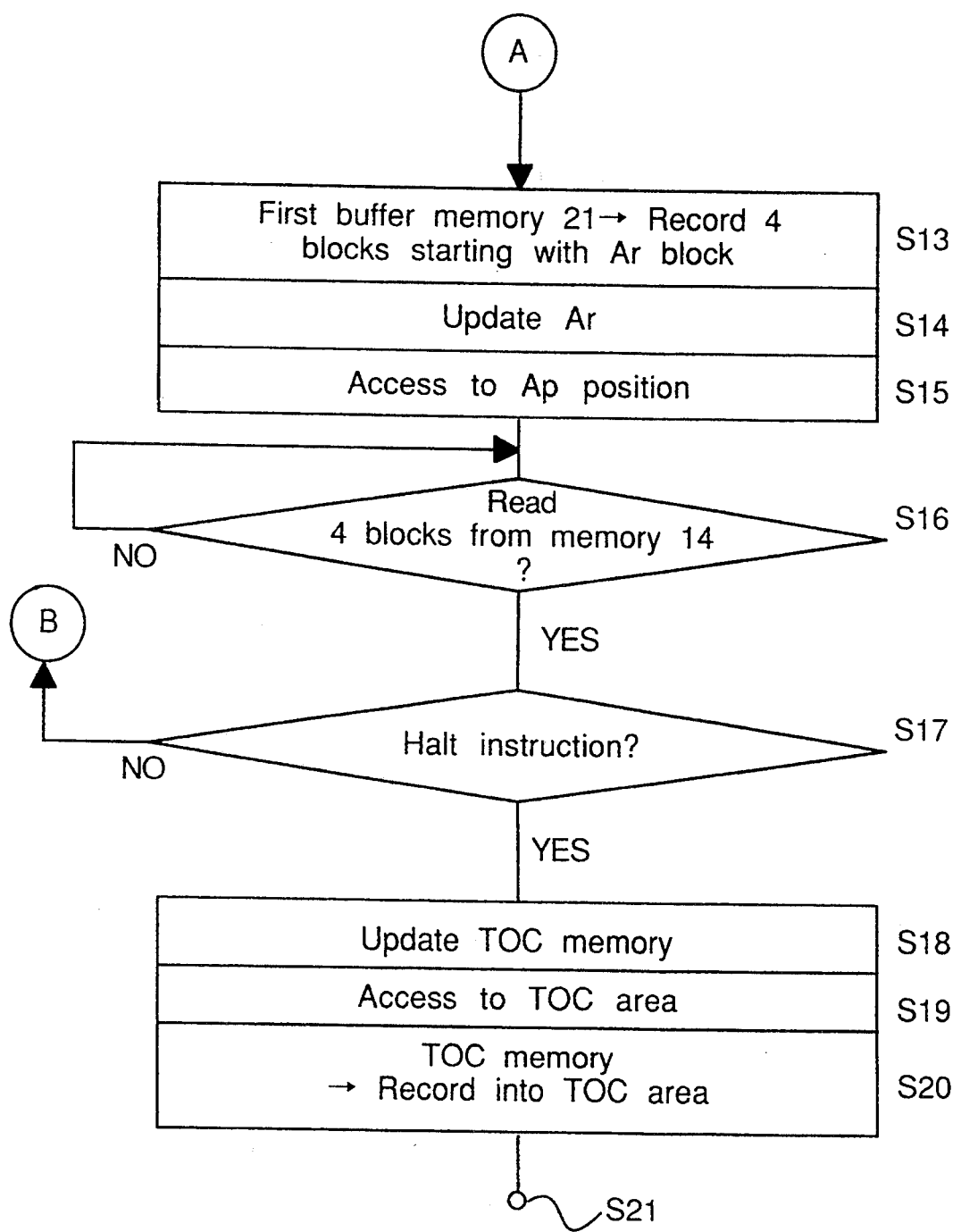
FIG. 1(A & B) is a flowchart showing control of concurrent recording/reproducing operation of a data recording/reproducing apparatus according to the present invention.
Figure 10:
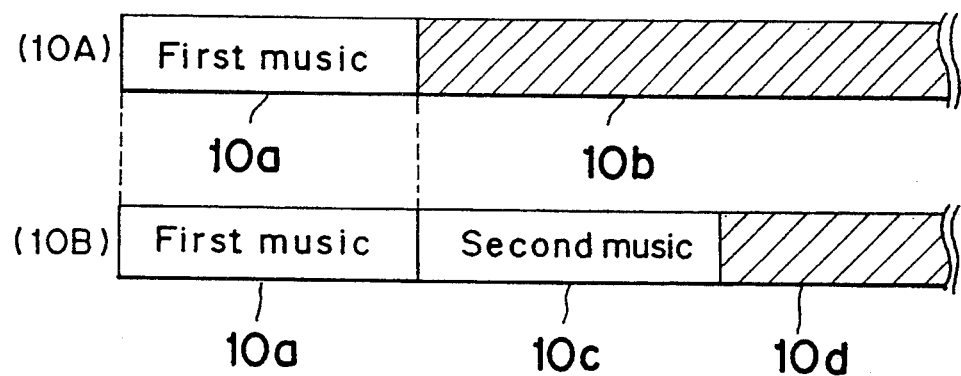
FIG. 10 is a schematic view showing allocation rows of musical data to be subjected to concurrent recording/reproduction.

FIG. 1 is a flowchart showing an example of the simultaneous recording/reproducing operation based on the above-described basic operations in the data recording/reproducing apparatus according to the present invention. The example in the figure is such that, with respect to such musical data of the primary data area as shown in FIG. 10 (10A), such control data as shown in Table 1 presented below is read from the TOC area 1a of the magneto-optical disc 1 and stored in the TOC memory 11, and that, while the reproducing operation of the first music 10a is performed, the recording operation is simultaneously performned, and as shown in FIG. 10 (10B), new musical data is additionally recorded as the second music 10c, and moreover the control data is updated and reregistered at the stage of stopping the recording. The following description is made on such a case in connection with the operational sequence diagram of FIG. 1.

TABLE 1

| Music No. | Recording-start absolute address position | Recording-end absolute address position |
|---|---|---|
| 01 | 01 min, 00 sec, 01 frame | 04 min, 18 sec, 15 frame |

Specifically, in FIG. 10 (10A), it is assumed that the first music 10a starts at [01 min, 00 sec, 01 frame], and ends at [04 min, 18 sec, 15 frame], and that the second music 10c, on the other hand, is recorded in succession to the tail of the first music 10a simultaneously while the first music 10a is being reproduced.

Figure 11:
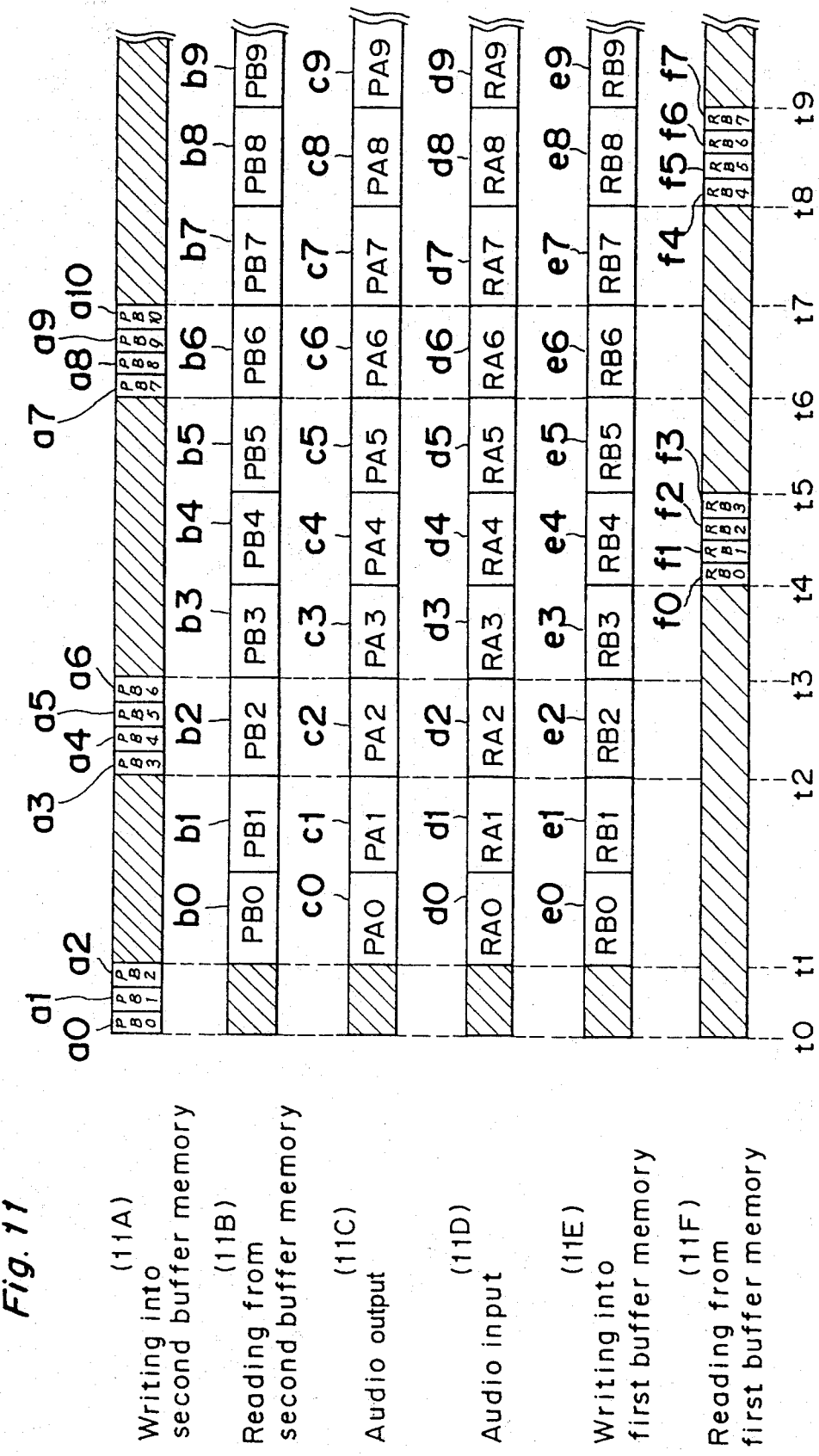
FIG. 11 is a timing chart showing data pertaining to the concurrent recording/reproducing operation.
Figure 12:
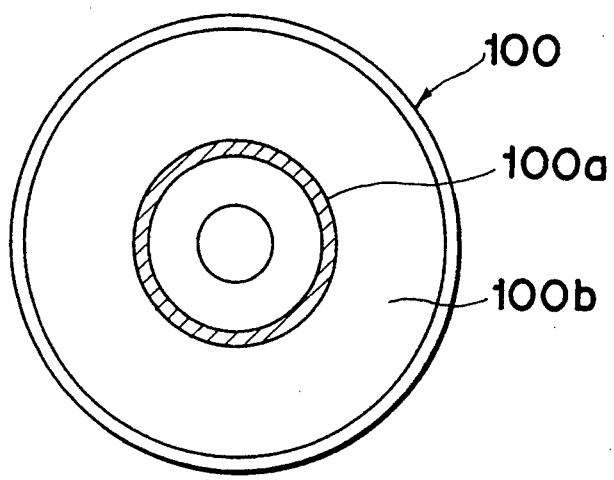
FIG. 12 is a schematic plan view of a compact disc for explaining the prior art.

With reference to the flowchart of FIG. 1 and the operational sequence diagram of FIG. 11, below described is the operation in the case where the simultaneous recording/reproducing operation, that is, the reproduction of the first music and the recording of the second music are performed in parallel. In FIG. 11, (11A), (11B), and (11C) represent a sequence of signals pertaining to the reproducing operation, where (11A) depicts the compressed audio data blocks reproduced from the magneto-optical disc 1 and written into the second buffer memory 14 from the reproducing data processing circuit 9, (11B) depicts the compressed audio data block read from the second buffer memory 14 and transmitted to the data decompression processing circuit 15, and (11C) depicts the audio data decompressed and outputted by the data decompression processing circuit 15.

Also, (11D), (11E), and (11F) represent a sequence of signals pertaining to the recording operation, where (11D) depicts the audio data inputted to the data compression processing circuit 20, (11E) depicts the compressed audio data block compressed by the data compression processing circuit 20 and thereafter written into the first buffer memory 21, and (11F) depicts the compressed audio data block to be recorded, which is read from the first buffer memory 21 and fed to the recording data processing circuit 22.

It is to be noted that in the following example of operation, delays of processing time of the data compression processing circuit 20 and the data decompression processing circuit 15 as shown in FIGS. 7 and 8 are omitted for simplicity of explanation.

In addition, the following description is based on the assumption that the first buffer memory 21 and the second buffer memory 14 have at least such capacities as can store 5 or more blocks of compressed audio data blocks.

When the simultaneous recording/reproducing instruction (hereinbelow, the contents of the instruction is assumed such that the first music is for reproduction and the second music for recording in succession to the tail of the first music) is given from the operating section 13 by a user and then instructed to the controller 10 (S0), the controller 10 first sets the reproducing block pertinent address (Ap) to [01 min, 00 sec, 01 frame] read from the TOC memory 11, which is the recording-start position of the designated music, or in this case, the first music 10a (S1), and moreover it sets the recording block pertinent address (Ar) to [04 min, 18 sec, 16 frame], which is an empty space decided from the contents of the TOC memory 11 (S2).

It is to be noted that (Ap) and (Ar) represent the leading absolute addresses for each compressed audio data block to be objected for reproduction and recording.

Next, an access operation is rendered to the (Ap) position, i.e. the head of the first music at (S3), and thereafter three blocks starting with the compressed audio data block pertinent to the (Ap) position are reproduced to write them into the second buffer memory 14 (S4). At step S5, by starting the reading from the second buffer memory 14, the audio data of the first music 10a starts to be reproduced via the optical head 3, the reproducing amplifier 5, the reproducing data processing circuit 9, the second buffer memory 14, and the data decompression processing circuit 15 through the D/A converter 16.

In correspondence to the timing chart of FIG. 11, during the period from t0 to t1 in FIG. 11 (11A), compressed audio data blocks PB0(a0), PB1(a1), and PB2(a2) are reproduced correspondingly to step S4 and written into the second buffer memory 14, and thereafter, the compressed audio data block PB0(b0) starts being read from the second buffer memory 14, as shown in FIG. 11 (11B), correspondingly to step S5, whereby the decompressed audio data starts being reproduced with PA0(c0). In the mean time, subsequent to (or in parallel to) step S5, writing into the first buffer memory 21 is started (S6).

Specifically, as shown in 11, at the time point t1 equal to the timing of starting the audio data reproduction, audio input data RA0(d0) in FIG. 11 (11D) is written into the first buffer memory 21 as a compressed audio data block RB0(e0) in FIG. 11 (11E).

Then, at step S7, the compressed audio data block pertinent address (Ap) to be subsequently reproduced is updated. Here, since the three blocks have already been reproduced at step S4, the address value is determined by adding another three-block equivalent, i.e. (15×3)=45 sectors, to the current (Ap) value. That is, 45 sectors are added to [01 min, 00 sec, 01 frame], thus giving an updated reproducing block pertinent address (Ap) of [01 min, 00 sec, 46 frame].

Further next, at step S8, it is determined whether or not reading the second buffer memory 14 has been completed by two blocks; if it has, then four blocks (60 sectors) are reproduced from [01 min, 00 sec, 46 frame], which is the address of the compressed audio data block (Ap) at step S9, being written into the second buffer memory 14.

The decision of how the buffer memory is being read at step S8 can be done by the sector address recognized by the data decompression processing circuit 15. As depicted by time points t1 to t3 in FIG. 11 corresponding to the above-described steps S8 to S9, the second buffer memory 14 starts being read, as shown in FIG. 11 (11B), from t1, and from the time point t2 at which two blocks, i.e. the compressed blocks PB0(b0) and PB1(b1) have completely been read, the second buffer memory 14 restarts being written as shown in FIG. 11 (11A), and subsequently the writing of the compressed audio data blocks PB3(a3), PB4(a4), PB5(a5), and PB6(a6) is executed.

Then the address (Ap) pertinent to the compressed audio data block to be succeedingly reproduced is updated at step S10. Here, four blocks have already been reproduced at step S9, and therefore the address value is given by adding four blocks to the current (Ap) value, and (15×4)=60 sectors is added to [01 min, 00 sec, 46 frame], thus yielding an updated reproducing block pertinent address (Ap) of [01 min, 01 sec, 31 frame].

Then, an access operation is executed to [04 min, 18 sec, 16 frame], which is recording block pertinent address (Ar) at step S11, and thereafter it is determined whether or not the writing of four compressed audio data blocks into the first buffer memory 21 has been completed; if it has, the four compressed audio data blocks are read out of the first buffer memory 21 at step S13 and fed to the recording data processing circuit 22, accomplishing the recording.

Referring to FIG. 11, from the time point t3 at which the writing of the compressed audio data blocks into the second buffer memory 14 has been completed in connection with step S9, the access operation to the recording block is started, and from the time point t4 at which the writing of four blocks, i.e. the compressed audio data blocks RB0 (e0), RB1 (e1), RB2 (e2) and RB3 (e3) into the first buffer memory 21 as shown in FIG. 11 (11E) is completed, the compressed audio data blocks RB0(f0), RB1(f1), RB2(f2), and RB3(f3) from the first buffer memory 21 is read as shown in FIG. 11 (11F) to be recorded at the pertinent position on the magneto-optical disc 1.

It is noted that the decision of whether or not the writing of four blocks into the first buffer memory 21 has been completed can be made from sector address data sequentially given to the data compression processing circuit 20 for each sector by the controller 10.

Next, the address (Ar) pertinent to the compressed audio data block to be succeedingly recorded is updated at step S14. Here the four blocks have already been recorded at step S13, and therefore, the address value is given by adding four blocks, i.e. (15×4)=60 sectors to the current (Ar) value. That is, 60 sectors are added to [04 min, 18 sec, 16 frame], yielding an updated recording block pertinent address (Ar) of [04 min, 19 sec, 01 frame].

Then an access operation is executed to the [01 min, 01 sec, 31 frame], which is the address (Ap) pertinent to the reproducing block to be next reproduced at step S15, and thereafter it is determined whether or not the reading of four compressed audio data blocks from the second buffer memory 14 has been completed; if it has, it is then determined whether or not there is an halt instruction or the like given from the operating section 12 at step S17; and if not, the program returns to 59 to repeat the same operations, thereby repeating intermittent reproducing and recording operations.

Referring to FIG. 11, from time point t5 at which the reading (recording) of the compressed audio data blocks from the first buffer memory 21 in connection with step S13, an access operation is executed to the address pertinent to the block to be succeedingly reproduced, and from time point t6 at which the reading of four blocks, i.e. the compressed audio data blocks PB2 (b2), PB3 (b3), PB4 (b4) and PB5 (b5) from the second buffer memory 14 as shown in FIG. 11 (11B) is completed, the writing of compressed audio data blocks PB7(a7), PB8(aS), PB9(a9), and PB10(a10) into the second buffer memory 14 as shown in FIG. 11 (11A) is executed.

On the other hand, when there is a halt instruction given from the operating section 12 at step S17, the program goes S18, the program reaches step S18, where recording-start and recording-end absolute address location data corresponding to the second music that has been recorded as described above are updated (added) in the TOC memory 11. Then an access operation to the TOC area 1a on the magneto-optical disc 1 is executed at step S19 and thereafter the contents of the TOC memory 11 are recorded in the TOC area 1a as new control data, thus ending a sequence of operations (S21).

It is to be noted that in the above example of operation, the access operations at steps S11 and S 15 are assumed to be completed within the periods from t3 to t4 and from t5 to t6, that is, within 0.8 second that is the time required for one pre-compression audio data block in the present invention. However, when the invention is applied to any system having a poor access performance, the invention can be made applicable to such cases by increasing the storage capacities of the second buffer memory 14 and/or the first buffer memory 21.

Further, in the above example of operation, it is arranged that if there is a halt instruction at step S17, the reproducing and recording operations are immediately halted, but alternatively it may be such that, at least on the recording side, the compressed audio block which is left (not recorded) in the first buffer memory 21 is recorded and thereafter the program reaches step S18.

In the way as described above, the operations are carried out repeatedly in the form of intermittent recording/reproduction with the compressed audio block using buffer memories, thereby allowing audio data after decompression and before compression to be reproduced and recorded without interruptions. Thus, it becomes substantially feasible to simultaneously perform reproduction and recording.

Although the above description has been made on an example based on the compact disc format, yet the present invention is not limited to this. Instead, block and sector constructions may of course be in various forms, and moreover address data also may be applied in various forms.

Also, the above-described embodiment has been described on an example in which audio data is treated, it is apparent that the present invention can be applied to cases in which image data or other visual or auditory continuous data.

Further, although the present embodiment has been described on an example in which compressed audio data is used, the present invention is not limited to this, but basically it can be applied in any forms where there is a difference in data transfer rate between the write and read side of the buffer memory.

For example, taking the case of the above-described compact disc format, the present invention is made applicable to uncompressed conventional compact disc audio data (sampling frequency: 44.1 kHz; quantization bit number: 16 bits, number of channels: 2) as it is, by increasing the line speed of the disc more than normal.

Furthermore, the present invention can be embodied with not only the optical disc apparatus used as computer-oriented external storage device, but also hard disks and floppy disks, and further with magnetic tape recording device, without departure from the spirit of the present invention.

As described hereinabove, the data recording/reproducing apparatus according to the present invention works in such a manner that audio data reproduced from a recording medium is stored in a second memory at a first transfer rate, and the audio data stored in the second memory is sequentially read at a second transfer rate lower than the first transfer rate to be audio-reproduced, while audio data inputted from external is sequentially stored in a first memory at the second transfer rate, and the audio data stored in the first memory is read at the first transfer rate to be recorded on the recording medium, thus allowing the recording operation to be performed simultaneously while the audio reproduction is being done.

Accordingly, it is possible that while a desired music or the like is being reproduced using a single data recording reproducing apparatus and recording medium, a different music or the like can be simultaneously recorded. Thus a data recording/reproducing apparatus having a new function and high in added value can be provided.

Further, when the contents of singing in accompaniment to the accompanying music, such as 'karaoke' previously prepared (recorded), are recorded, or when the mixing recording is over-recorded for each instrument using a plurality of musical instruments, those can be made possible with a single data recording/reproducing apparatus and recording medium, necessitating only low price and smaller location space as well as allowing the system to be provided as one excellent in operability.

Moreover, the fact that a single recording medium will do for such purposes of use provides another advantage that the recording medium can be improved in its storage and control.

Further, it is also possible to use, as a recording medium for such purposes, so-called partial ROM discs in which the aforementioned accompanying music is previously recorded in pit form such as in compact discs with some portion of the disc exclusively dedicated to reproduction and the rest thereof used as recordable area, whereby new disc usage can be developed and at the same time the user is relieved of the need of previously recording the accompanying music, further increasing the conveniences of the system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data recording/reproducing apparatus for recording and/or reproducing audio data onto or from a recording medium having absolute address data, the apparatus comprising:
   a first memory for recording;
   a second memory for reproducing;
   a first reproducing means for reading audio data on the recording medium by the block and storing them in the second memory at a first transfer rate;
   a second reproducing means for sequentially reading the audio data stored in the second memory at a second transfer rate lower than the first transfer rate and sequentially outputting them;
   a first recording means for sequentially storing audio data, which is inputted from external, in the first memory at the second transfer rate;
   a second recording means for reading the audio data stored in the first memory at the first transfer rate and recording them in the recording medium by the block; and
   control means for controlling the apparatus so that writing operation into the second memory by the first reproducing means and reading operation from the first memory by the second recording means are alternately repeated.

2. The data recording/reproducing apparatus as claimed in claim 1, the controlling means includes means for instructing simultaneous operation of reproduction and recording.

3. Apparatus for reproducing audio data comprising a first audio work from a recording medium and essentially simultaneously recording audio data comprising a second audio work on the recording medium, the apparatus comprising:
   a record head;
   a record data compression circuit for compressing audio data-to-be-recorded;
   a first memory connected to the record data compression circuit for storing compressed audio data-to-be-recorded;
   a formatting circuit connected to receive compressed audio data-to-be-recorded from the first memory and to transmit the compressed audio data-to-be-recorded to the record head;
   a read head;
   a de-formatting circuit connected to receive compressed audio data reproduced by the read head;
   a second memory connected to the de-formatting circuit for storing the deformatted and compressed audio data;
   a de-compression circuit connected to the second memory for de-compressing audio data received from the memory;
   a controller which controls the transfer of audio data into and from the first memory and the second memory, whereby audio data read is read out of the first memory at a first transfer rate and stored in the second memory at the first transfer rate, and whereby audio data is read out of the second memory at a second transfer rate and stored in the first memory at the second transfer rate, the second transfer rate being lower than the first transfer rate, and which repetitively alternates the reading out of audio data comprising the second audio work from the first memory and the storing of audio data comprising the first audio work in the second memory.

* * * * *